(12) United States Patent
Padhye et al.

(10) Patent No.: US 12,217,106 B2
(45) Date of Patent: Feb. 4, 2025

(54) AUTO-DISCOVERY OF SEQUENTIAL, TRANSACTIONAL MILESTONES IN APPLICATION OBSERVABILITY DATA

(71) Applicant: Cisco Technology, Inc., San Jose, CA (US)

(72) Inventors: Jaideep Padhye, San Jose, CA (US); Tom Thekkel Jose, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/213,513

(22) Filed: Jun. 23, 2023

(65) Prior Publication Data

US 2024/0427650 A1    Dec. 26, 2024

(51) Int. Cl.
*G06F 9/54* (2006.01)
*G06F 11/32* (2006.01)
*H04L 67/02* (2022.01)

(52) U.S. Cl.
CPC ............ *G06F 9/542* (2013.01); *G06F 11/324* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,546,601 B2 | 6/2009 | Byrd et al. | |
| 7,904,324 B2* | 3/2011 | Gura | G06Q 10/06 705/7.23 |
| 8,190,459 B1* | 5/2012 | Fong | G06Q 10/063 705/7.11 |
| 8,376,749 B2* | 2/2013 | Lowry | G06F 9/542 434/118 |
| 8,489,457 B2* | 7/2013 | Masewicz | G06Q 30/0261 705/14.58 |
| 8,869,028 B2* | 10/2014 | Rich | G06Q 10/10 707/762 |
| 10,331,693 B1* | 6/2019 | Kothandaraman | G06F 16/212 |
| 10,628,775 B2 | 4/2020 | Gauthier et al. | |
| 10,812,319 B1* | 10/2020 | Prakash | H04L 41/046 |
| 10,817,531 B2* | 10/2020 | Sinha | G06F 16/282 |

(Continued)

OTHER PUBLICATIONS

"Example Business Workflow configuration", online: https://docs.splunk.com/observability/apm/workflows/example-business-workflow.html#apm-example-business-workflow, accessed Jun. 22, 2023, 2 pages.

(Continued)

*Primary Examiner* — Lashonda Jacobs-Burton
(74) *Attorney, Agent, or Firm* — BEHMKE INNOVATION GROUP LLC; James M. Behmke; James J. Wong

(57) ABSTRACT

In one embodiment, a device determines one or more key-value pairs associated with observability data for an online application, and searches the observability data for events corresponding to the one or more key-value pairs. The device also builds a responsive event list with the events corresponding to the one or more key-value pairs within the observability data and sorts the responsive event list by associated timestamps to provide the responsive event list as a sequence of transactional milestones reached by one or more users of the online application.

17 Claims, 9 Drawing Sheets

(56) References Cited

U.S. PATENT DOCUMENTS

| | | | |
|---|---|---|---|
| 10,885,049 B2 | 1/2021 | Beringer et al. | |
| 11,151,125 B1* | 10/2021 | Dwivedi | G06F 11/3409 |
| 11,263,229 B1* | 3/2022 | Basavaiah | G06F 16/2477 |
| 11,269,876 B1* | 3/2022 | Basavaiah | G06F 8/77 |
| 11,294,546 B2 | 4/2022 | Ignatyev et al. | |
| 11,321,217 B1* | 5/2022 | Agarwal | G06F 11/3082 |
| 11,488,044 B2* | 11/2022 | Harvey | G06F 16/285 |
| 11,520,792 B2* | 12/2022 | Zhang | G06F 16/24554 |
| 11,689,545 B2* | 6/2023 | Mo | H04L 63/1433 726/25 |
| 11,748,160 B1 | 9/2023 | Bitincka | G06F 9/4887 718/102 |
| 11,841,880 B2* | 12/2023 | Batanov, III | G06F 16/285 |
| 2006/0143034 A1* | 6/2006 | Rothermel | G06Q 10/10 705/301 |
| 2007/0219992 A1* | 9/2007 | Bollinger | G06F 16/2465 |
| 2009/0089252 A1* | 4/2009 | Galitsky | G06F 16/245 |
| 2012/0004947 A1 | 1/2012 | Dombrowski et al. | |
| 2012/0079408 A1* | 3/2012 | Rohwer | G06Q 10/06 715/772 |
| 2013/0305094 A1* | 11/2013 | Hopley | G06F 11/3624 714/E11.208 |
| 2014/0316834 A1* | 10/2014 | Langhorne, III | G06Q 10/0631 705/7.15 |
| 2015/0242782 A1* | 8/2015 | Onions | G06Q 10/06313 705/7.23 |
| 2015/0278751 A1* | 10/2015 | Sunder | G06Q 10/063114 705/7.15 |
| 2016/0019251 A1* | 1/2016 | Marks | G06F 16/2282 707/752 |
| 2016/0343028 A1* | 11/2016 | Unser | G06Q 50/01 |
| 2017/0236221 A1* | 8/2017 | Davidson | G06Q 30/0633 705/7.23 |
| 2017/0318074 A1* | 11/2017 | Margatan | G06Q 30/0241 |
| 2018/0048667 A1* | 2/2018 | Tang | H04L 63/1416 |
| 2018/0089272 A1* | 3/2018 | Bath | G06F 16/22 |
| 2018/0089286 A1* | 3/2018 | Marquardt | G06T 11/206 |
| 2018/0089288 A1* | 3/2018 | Haggie | G06F 16/90335 |
| 2018/0300304 A1* | 10/2018 | Mullins | G06Q 10/10 |
| 2018/0300642 A1* | 10/2018 | Guo | G16H 50/70 |
| 2019/0332962 A1* | 10/2019 | Harvey | G06F 9/542 |
| 2021/0110328 A1* | 4/2021 | Hsiao | G06Q 10/06316 |
| 2022/0043807 A1 | 2/2022 | Dwivedi et al. | |
| 2022/0147432 A1* | 5/2022 | Górski | G06F 11/3452 |
| 2023/0006907 A1* | 1/2023 | Mackie | H04L 43/10 |

OTHER PUBLICATIONS

"Analyze Data Using SignalFlow", online: https://dev.splunk.com/observability/docs/signalflow/, accessed Jun. 22, 2023, 23 pages.

Kaiser, Gary, "Dynatrace enhances Business Analytics with business events powered by Grail", online: https://www.dynatrace.com/news/blog/dynatrace-enhances-business-analytics/, accessed Jun. 22, 2023, 10 pages.

"DQL matcher in business events", online: https://www.dynatrace.com/support/help/platform-modules/business-analytics/ba-events-processing/ba-events-processing-matcher, accessed Jun. 22, 2023, 7 pages.

"Real-Time Business Intelligence", online: https://www.datadoghq.com/solutions/real-time-business-intelligence/, accessed Jun. 23, 2023, 7 pages.

* cited by examiner

| EVENT TYPE 410 | ID 420 | TIMESTAMP 430 | DETAILS 440 |
|---|---|---|---|
| Transaction | 121e1e | 2021-04-01 22:22:23 | dropdown ∨ |
| Log | 2314e3 | 2021-04-01 22:22:22 | http.sessionId: 0x34234 ☑ |
| Browser | 13ed32d | 2021-04-01 22:22:21 | http.respCode: 200 ☐ |
| Browser | 231e32f | 2021-04-01 22:22:20 | http.respTimeInMs: 3011 ☐ |
| Transaction | 34e3df | 2021-04-01 22:22:19 | [ Discover BJ > ] |

FIG. 4

```
/SearchInAllDocuments (value: 0x34234)
{
  milestones: [
    {name: AddToCart, EventType:Transaction, Match Field:http.SessionID, Timestamp: 2021-04-01 22:22:23},
    {name: Checkout, EventType:Transaction, Match Field: Ecommerce.CartID, Timestamp: 2021-04-01 22:22:23},
    {name: ShippingAddress, EventType:Transaction, MatchField:http.SessionID, Timestamp: 2021-04-01 22:22:23},
    {name: PaymentGateway, EventType:Transaction, MatchField:Ecommerce.PaymentID, Timestamp: 2021-04-01 22:22:23},
  ]
}
```

2g34h5tgk
```
{ status: ACTIVE,
    milestones: [
        { name: addToCart, event Type: transaction, matchField: http.sessionId},
        { name: checkout, event Type: transaction, matchField: ecommerce.cartId},
        { name: shipping Address, event Type: transaction, matchField: http.sessionId},
        { name: payment Gateway, event Type: transaction, matchField: ecommerce.paymentId},
    ]
}
```

200
{ status: TOMBSTONE,
    milestones: [
        { name: addToCart, event Type: transaction, matchField: http.respCode},
        { name: checkout, event Type: transaction, matchField: http.respCode},
        ........more than 30 mathches as http resp code is commonly found in all transactions
        { name: payment Gateway, event Type: transaction, matchField: http.respCode},
    ]
}

4tr3g3t6h
```
{ status: ACTIVE,
    milestones: [
        { name; addToCart, event Type: transaction, matchField: http.sessionId},
        { name: checkout, event Type: transaction, matchField: ecommerce.cartId,},
        { name: shipping Address, event Type: transaction, matchField: http.sessionId},
        { name: payment Gateway, event Type: transaction, matchField: ecommerce.payment Id},
    ]
}
```

4647979
```
{ status: ACTIVE,
    milestones: [
        { name: login, event Type: transaction, matchField: userId},
        { name: search, event Type: transaction, matchField: userId,},
        { name: recommendation, event Type: transaction, matchField: userId},
        { name: addToCart, event Type: transaction, matchField: userId},
    ]
}
```

FIG. 7A

```
/getAllDistinctValues(status: ACTIVE)
{
    journeys: [ { milestones: [
        {name: login, eventType: transaction, matchField: userId},
        {name: search, eventType: transaction, matchField: userId,},
        {name: recommendation, eventType: transaction, matchField: userId},
        {name: addToCart, eventType: transaction, matchField: userId},
    ]},
    { milestones: [
        {name: addToCart, eventType: transaction, matchField: http.sessionId},
        {name: checkout, eventType: transaction, matchField: ecommerce.cartId,},
        {name: shippingAddress, eventType: transaction, matchField: http.sessionId},
        {name: paymentGateway, eventType: transaction, matchField: ecommerce.paymentId},
    ]
    }
    ]
}
```

FIG. 7B

AUTO-DISCOVERY OF SEQUENTIAL, TRANSACTIONAL MILESTONES IN APPLICATION OBSERVABILITY DATA

TECHNICAL FIELD

The present disclosure relates generally to computer networks, and, more particularly, to the auto-discovery of sequential, transactional milestones in application observability data.

BACKGROUND

Online applications are becoming increasingly complex systems that comprise many (micro-) services hosted across a wide variety of locations. For instance, consider the case of a retail application whereby a user first logs into their account, then browses for products, adds a selected product to their cart, enters payment information, confirms their order, and then checks out, to complete the purchase. Underlying each of these transactional milestones from the standpoint of a user may be the various services associated with the retail application. For example, the user logging in may entail their mobile app connecting to an identity service, the checkout may entail sending their credit card information to a financial service for approval, etc.

Because of the nature of modern applications, observability data is rarely available in a centralized manner and is often only available from different sources. For instance, a mobile agent might report user login telemetry if the user logs in from a mobile app, certain portions of the system may not be instrumented using an application performance monitoring (APM) solution and only log data is available regarding the products browsed by the user, etc. For this reason, visualizing the sequences of transactional milestones from the standpoint of an end user typically requires the interactions of multiple teams (e.g., business teams, development teams, etc.) to first specify the sequences of interest and then build telemetry collection mechanisms to cross-associate the telemetry into a cohesive visualization of the sequences.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example event viewer used for cue-based auto-discovery of sequential, transactional milestones, in accordance with embodiments of the present disclosure;
FIG. 5 illustrates an example of pseudo-code that can be executed on the back end to search select events to generate a discovered sequence of transactional milestones, in accordance with embodiments of the present disclosure;
FIGS. 7A-7B illustrate an example of pseudo-code that can be executed to perform auto-discovery of sequence of transactional milestones in accordance with embodiments of the present disclosure.

DESCRIPTION OF EXAMPLE EMBODIMENTS

Overview

According to one or more embodiments of the disclosure, a device determines one or more key-value pairs associated with observability data for an online application, and searches the observability data for events corresponding to the one or more key-value pairs. The device also builds a responsive event list with the events corresponding to the one or more key-value pairs within the observability data and sorts the responsive event list by associated timestamps to provide the responsive event list as a sequence of transactional milestones reached by one or more users of the online application.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
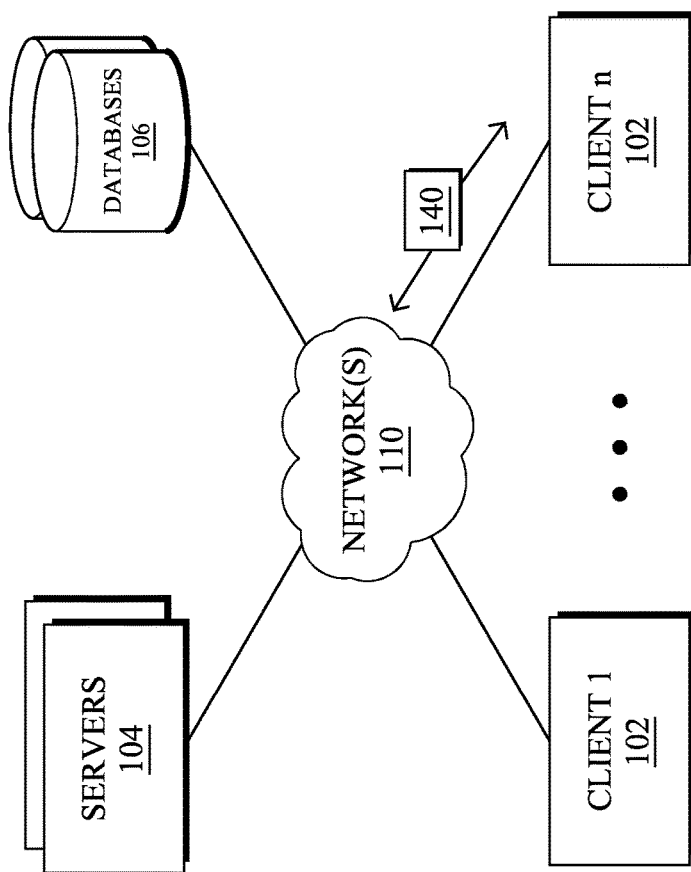
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
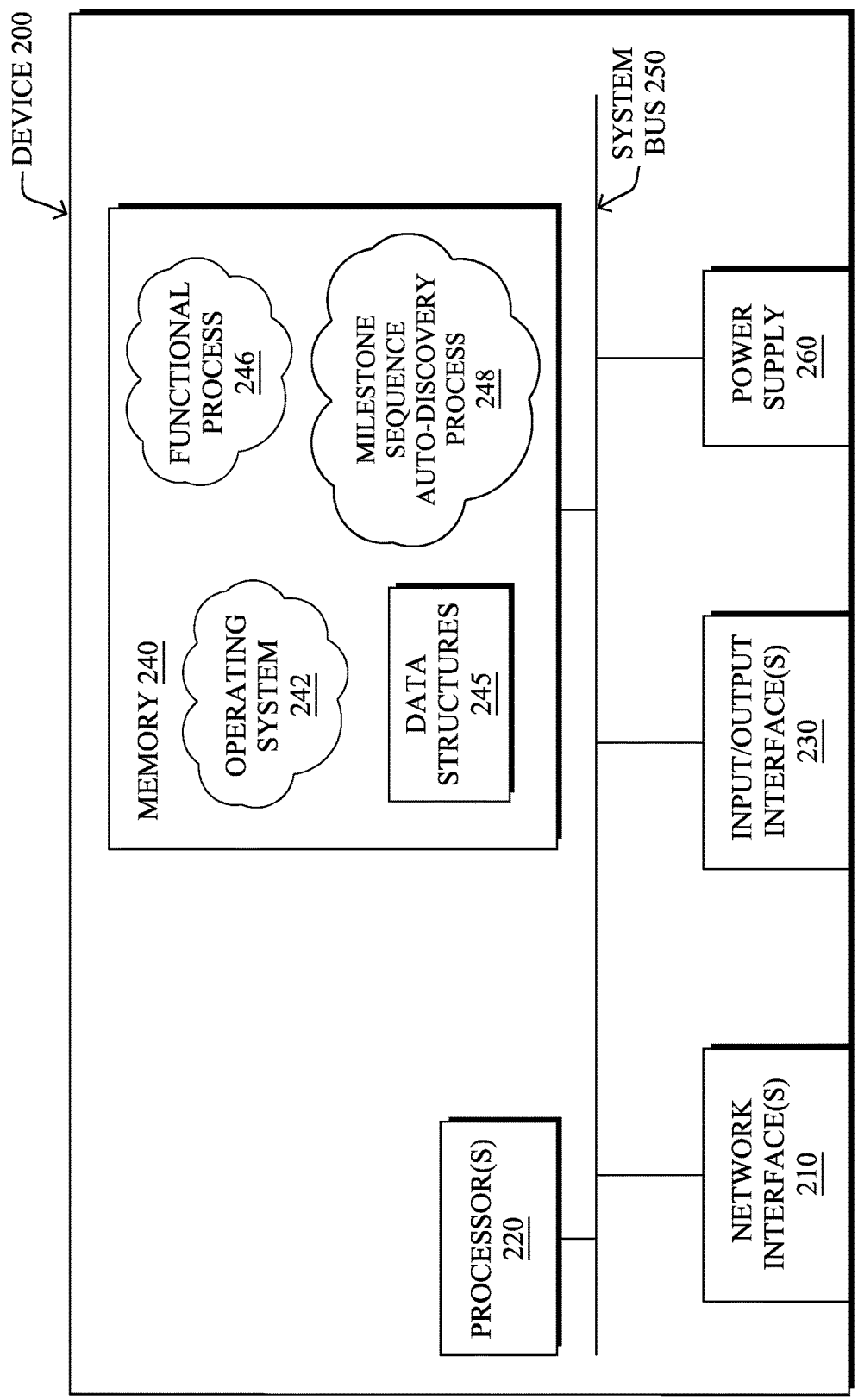
FIG. 2 illustrates an example computing device/node.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "milestone sequence auto-discovery" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet)

through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
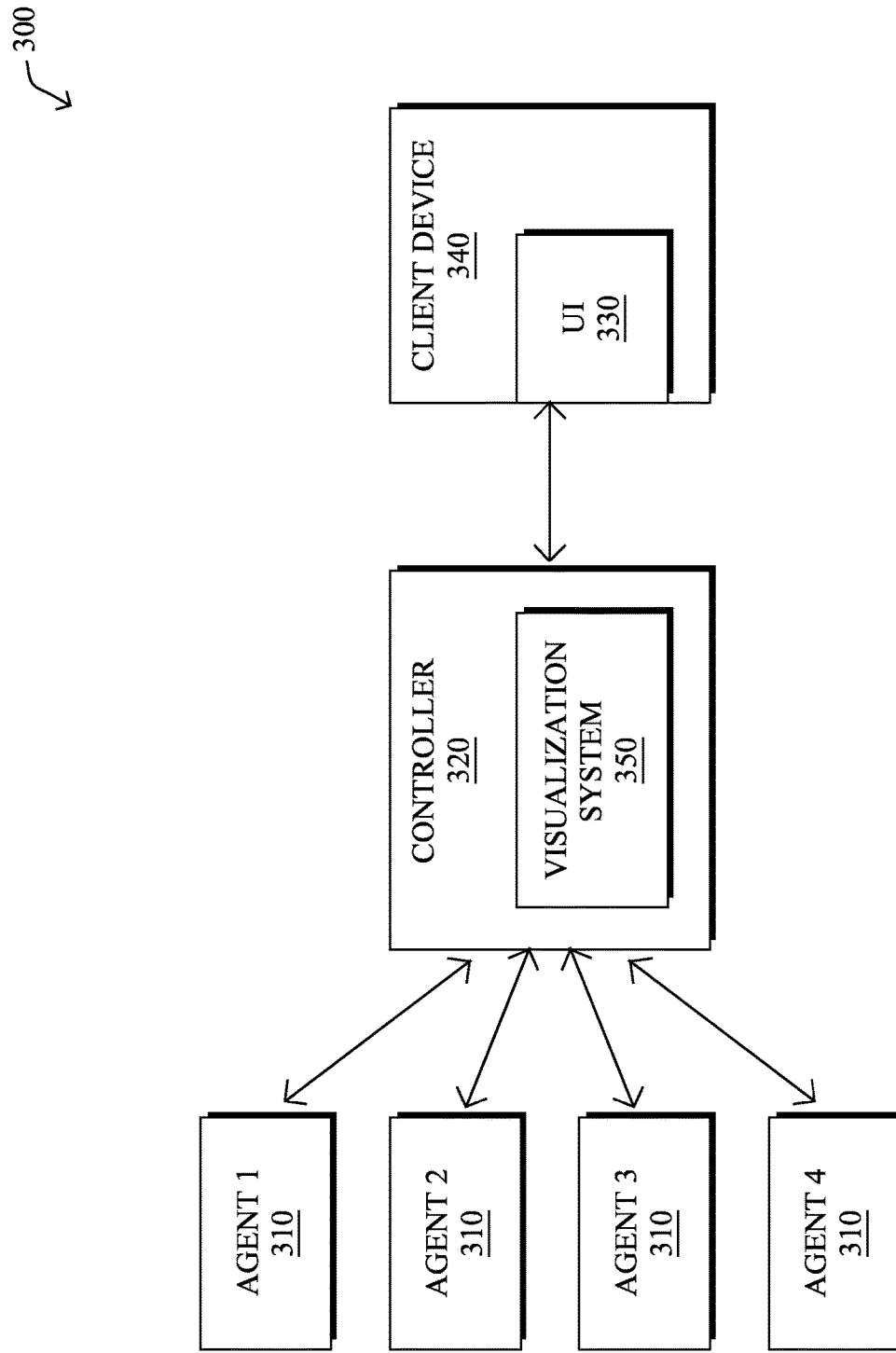
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310, one or more sources 312, and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from different agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from different sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Auto-Discovery of Sequential, Transactional Milestones in Application Observability Data As noted above, the complexity of configuration in applications that involve the visualization of sequential, transactional milestones within an application is one of the paramount hinderances in adoption of such functionality. For example, configuration of a visualization for a single sequence of transactional milestones commonly involves discussions with multiple development teams (e.g., business teams, devops teams, development teams, etc.) to identify business transactions generated at different milestones of the business process, determine fields that carry a common identifier that forms the primary key of the transactional milestone sequence, and/or determine which field(s) needs to be configured for different milestones, etc. This complexity of configuration therefore often times hampers adoption of SaaS products directed to such observability.

As a result, a key challenge that may arise in the above scenarios, and in providing transactional milestone sequences in general, is reducing the complexity of configuration of transactional milestone sequences. A solution to these challenges is to provide the capability of auto-discovering transactional milestone sequences by analyzing the data collected from a customer and providing visualizations of discovered transactional milestone sequences. Accordingly, the auto-discovery of business processes of the present disclosure allow customers to harness the power of transactional milestone sequences to manage their business processes efficiently and in a short span of time.

Specifically, the techniques introduced herein allow for auto-discovery of business practices, and, more particularly, auto-discovery of business practices involving observability data. Observability data, in particular, may correspond to metrics, events, logs, and traces, or "MELT" data (or also herein "melt data").

In accordance with the disclosure, multiple solutions for auto-discovering transactional milestone sequences in customer data are described herein. Some such examples include auto-discovery of loops, forks, and/or joins in the transactional milestone sequence. Further, some embodiments further contemplate support of transactional milestone sequences with primary key transitions. The techniques described herein therefore provide an improvement to transactional milestone sequence visualization by reducing the complexities associated with previous approaches thereby providing an enhanced customer experience. Specifically, according to various embodiments, a process determines one or more key-value pairs associated with observability data, and searches the observability data for events corresponding to the one or more key-value pairs. The process then builds a responsive event list with the events corresponding to the one or more key-value pairs within the observability data and sorts the responsive event list by associated timestamps to provide the responsive event list as a sequence of transactional milestones reached by one or more users of the online application.

Illustratively, the techniques described herein may be performed by hardware, software, and/or firmware, such as in accordance with milestone sequence auto-discovery process 248, which may include computer executable instructions executed by the processor 220 (or independent processor of interfaces 210) to perform functions relating to the techniques described herein.

Cue-Based Auto-Discovery

Operationally, FIG. 4 illustrates an event viewer 400 used for cue-based auto-discovery of transactional milestone sequences in accordance with embodiments of the present disclosure. The event viewer 400 can be presented on a graphical user interface, such as the user interface 330 of FIG. 3. As shown in FIG. 4, the event viewer 400 displays example melt data in columns (e.g., the event type 410, the ID 420, the time stamp 430, etc.). As shown in FIG. 4, various event types can include transaction events, log events, browser events, etc., although event types not explicitly illustrated in FIG. 4 are contemplated within the scope of the disclosure.

The event viewer 400 can provide details 440 involving parameters associated with auto-discovery of transactional milestone sequences. For example, for each detail entry, the event viewer 400 can display a dropdown menu in which a user can select one or more key-value pairs to be used in auto-discovery of transactional milestone sequences.

Accordingly, in this embodiment, a user can be presented with ingested melt data via the event viewer 400. The user can then identify one or more key-value pairs that the user believes could be a suitable primary key for generation of the transactional milestone sequence. Once the user has selected one or more key-value pairs for generation of the transactional milestone sequence (e.g., through checkboxes as shown), the auto-discovery process of the transactional milestone sequence begins.

On the backend, events that correspond to the key-value pair selected by the user are searched. Once the events have been searched, a response is generated and sorted by timestamp to generate a discovered transactional milestone sequence. FIG. 5 illustrates an example of pseudo-code 500 that can be executed on the back end to perform the operations described above.

In various embodiments, the user then customizes each of the milestones with the chosen key-value pair to represent the milestone name in their business process and commits the discovered transactional milestone sequence to start building the visualization. The discovered transactional milestone sequence can, once completed, be displayed on the graphical user interface for ease of consumption by the user.

Figure 6:
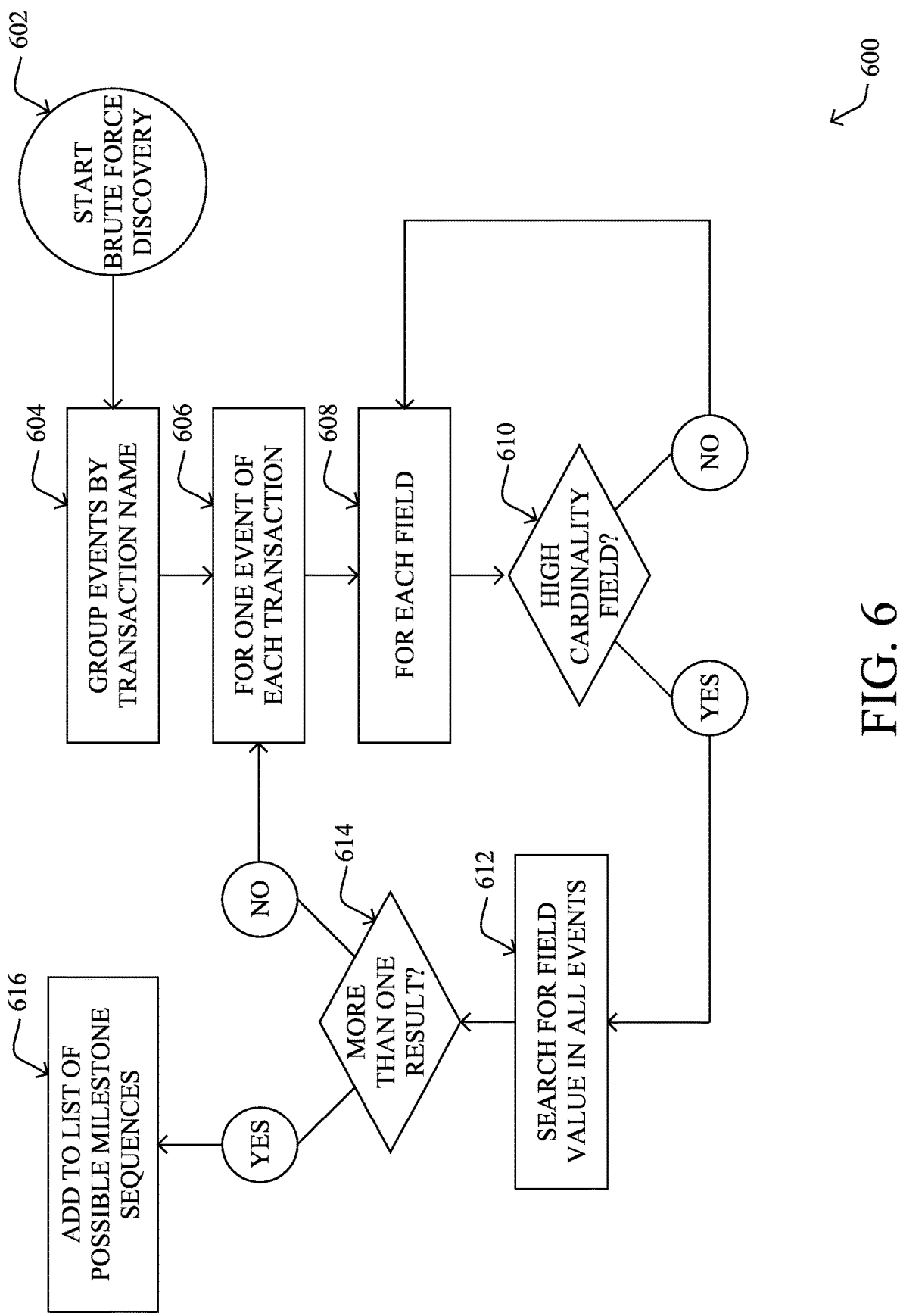
FIG. 6 illustrates an example flow for brute-force auto-discovery of sequence of transactional milestones, in accordance with embodiments of the present disclosure.

Operationally, in some embodiments, the system may take a brute force approach to visualizing transactional milestone sequences for an online application, in various embodiments. By way of example, FIG. 6 illustrates an example flow 600 for brute-force auto-discovery of transactional milestone sequences in accordance with embodiments of the present disclosure. In contrast to the cue-based auto-discovery of transactional milestone sequences discussed in connection with FIGS. 4-5 above, when using brute-force auto-discovery of transactional milestone sequences, the user specifies a start time of events to be considered and an end time of events to be considered, and the auto-discovery of transactional milestone sequences process is initiated.

For example, at operation 602, the brute-force auto-discovery process can be started. In some embodiments, the brute-force auto-discovery process may be started in response to a user command (e.g., a command that includes parameters to be used in the brute-force auto-discovery process, such as a start time of events to be considered and an end time of events to be considered, etc.).

At operation 604 events (e.g., the events discussed above in connection with FIG. 4) are grouped by transaction name. In some embodiments, the events are grouped automatically (e.g., without further input from a user). At operation 606, the brute-force auto-discovery process can determine at least one event for each transaction. Further, at operation 608, the brute-force auto-discovery process can determine at least one field for a particular transaction.

At operation 610, a determination is made as to whether the field observed at operation 608 is a high cardinality field (i.e., one with a large number of distinct values). That is, at operation 610, a cardinality of the field from operations 604, 606, and/or 608 can be determined. As used herein, the term "cardinality" and variants thereof, generally refer to the uniqueness of the values contained in a database column and/or or row, such as the columns and rows shown in FIG. 4. In general, if most of the values in such columns and/or rows are distinct, then the values in such columns and/or rows are distinct are considered to have high cardinality. In contrast, if the values in the columns and/or rows contain mostly repeated values, then such columns and/or rows are considered to have a low cardinality.

In various embodiments, the cardinality of various fields is considered because in the brute-force auto-discovery of transactional milestone sequences described in connection with FIG. 6 can be very expensive (e.g., in terms of processing power, time, energy, etc.) if a search through all the fields of every event, record, and/or document involved in the transactional milestone sequence is conducted. Accordingly, to narrow down the search space, the high cardinality fields (as determined at operation 610) of each transaction can be identified and then for particular events of each transaction, the value(s) of high cardinality fields can be used to efficiently search through the events, records, and/or documents to perform auto-discovery of transactional milestone sequences in accordance with the disclosure.

If, at operation 610, the cardinality for a particular transaction is determined to be less than a threshold (e.g., "no"), the flow 600 returns to operation 608 to determine a different field for a particular transaction. If, however, at operation 610, the cardinality for a particular transaction is determined to be greater than a threshold (e.g., "yes"), the flow 600 continues to operation 612 where a field value search is conducted for all events that meet the cardinality threshold criteria of operation 610.

At operation 614, it is determined whether the field value search conducted for all events that meet the cardinality threshold criteria at operation 612 produces more than one result. If, at operation 614, it is determined that a single result (e.g., "no" at operation 614) for the particular transaction is detected, the flow 600 returns to operation 606. However, if, at operation 614, it is determined that more than one result (e.g., "yes" at operation 614) for the particular transaction is detected, the flow 600 continues to operation 616, where the result of the brute-force auto-discovery process is added to a list of possible transactional milestone sequences.

In yet another embodiment, a user can activate a setting that enables the system to discover transactional milestone sequences in streaming data that is buffered for the chosen time period. For example, if the user has the knowledge that most of their business processes of interest do complete within 10 minutes, then the user can ask the system to monitor business processes identified in a 10-minute window. In these embodiments, the backend system maintains a reverse index of all the values seen in fields of different events. For example, for any key, if the length of collected milestones goes above a configured number (e.g., 30) then that key can be marked as a "tombstone" and further collection and/or processing of information can be stopped. This may happen in the case of common fields like HTTP response codes that may match a majority of transactions. In other embodiments, these common fields may be ignored. An example of pseudo-code 700a that can be executed on the back end to perform the operations described is shown in FIG. 7A where every 10 minutes the system runs a query collecting all values with ACTIVE status and returns all the distinct values. Once values are harvested the cache is reset in the non-limiting example pseudo-code 700b illustrated in FIG. 7B.

Figure 8:
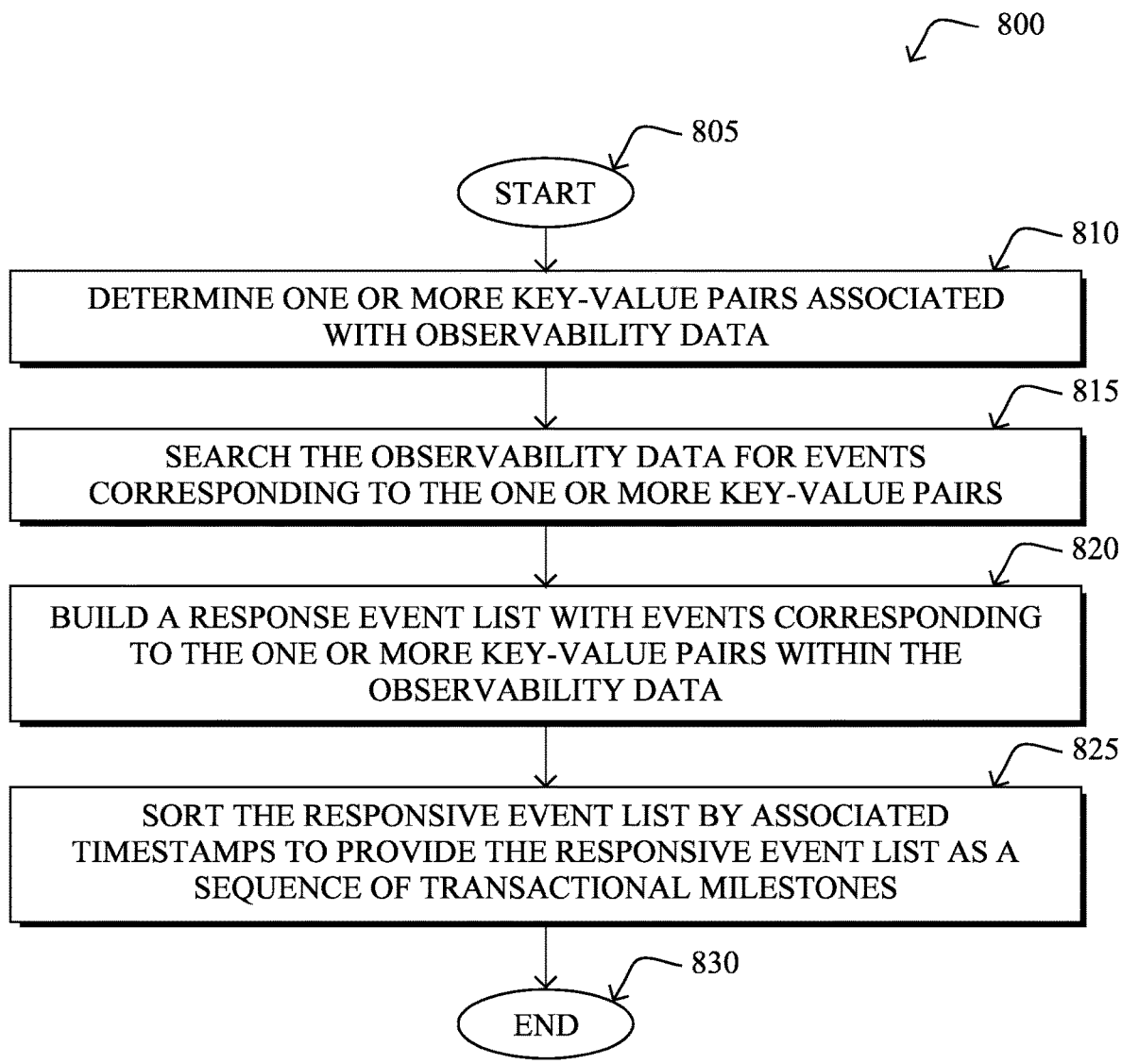
FIG. 8 illustrates an example simplified procedure for auto-discovery of sequential, transactional milestones in application observability data, in accordance with embodiments of the present disclosure.

FIG. 8 illustrates an example simplified procedure for auto-discovery of sequential, transactional milestones in application observability data, in accordance with one or more embodiments described herein. For example, a nongeneric, specifically configured device for auto-discovery of sequential, transactional milestones in application observability data (e.g., device 200), may perform procedure 800 (e.g., a method) by executing stored instructions (e.g., milestone sequence auto-discovery process 248). The procedure 800 may start at step 805, and continues to step 810, where, as described in greater detail above, the device (e.g., a controller, processor, etc.) may determine, by a process, one or more key-value pairs associated with observability data.

In some embodiments, the observability data comprises metrics, events, logs, and traces. Additionally, or in the alternative, the procedure 800 may determine the one or more key-value pairs by identifying specific key-value pairs. In some embodiments, the procedure 800 may list the key-value pairs based on a report corresponding to the observability data. The key-value pairs can be identified and/or selected by a user or system administrator in accordance with the disclosure.

In various embodiments, the procedure 800 can include determining the key-value pairs by identifying a start time and an end time for the process. In such embodiments, the procedure 800 can further include finding all key-value pairs within the start time and the end time within the observability data and selecting one or more key-value pairs to search. The start time and an end time can be selected by a user or system administrator. The one or more key-value pairs can include all the key-value pairs, or can include less than all the key-value pairs. For example, selecting the one or more key-value pairs can include selecting only key-value pairs based on a cardinality (e.g., a high cardinality field) associated with the one or more key-value pairs, as described in connection with FIG. 6, although embodiments are not so limited.

The procedure 800 can include determining the one or more key-value pairs by identifying a length of time and buffering streaming observability data for the length of time. In such embodiments, the procedure 800 can further include finding all key-value pairs within the streaming observability data during the length of time and selecting one or more of the key-value pairs to search. In such embodiments, the procedure 800 can include determining the one or more key-value pairs by collecting all active key-value pairs and selecting distinct key-value pairs to search.

In various embodiments, the procedure 800 can further include collecting all active key-value pairs further by collecting all key-value pairs up to a threshold number of milestones and discarding key-value pairs past the threshold number of milestones. In such embodiments, the procedure 800 can further include maintaining a reverse index of all key-value pairs seen within the length of time in fields of different events.

At step 815, as detailed above, the process may search the observability data for events corresponding to the one or more key-value pairs. As discussed above, the key-value pairs may be associated with observability data.

At step 820, the process may build a responsive event list with the events corresponding to the one or more key-value pairs within the observability data. The responsive event list may include discovery of loops, forks, and/or joins in the transactional milestone sequence, as discussed above.

At step 825, as detailed above, the process may sort the responsive event list by associated timestamps to provide the responsive event list as a sequence of transactional milestones reached by one or more users of the online application.

In various embodiments, that procedure 800 may generate a graphical visualization for a user interface to provide the responsive event list as the sequence of transactional milestones reached by one or more users of the online application. The user interface may be analogous to the user interface 330 discussed in connection with FIG. 3, herein. In some embodiments, the graphical visualization portrays one or more customized milestones, as discussed above.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for auto-discovery of business processes in melt data. More specifically, by providing the capability of auto-discovering transactional milestone sequences through analysis of the data collected from a customer and providing visualizations of discovered transactional milestone sequences, the auto-discovery of sequential, transactional milestones in application observability data of the present disclosure allow customers to harness the power of transactional milestone sequences to manage their business processes efficiently and in a short span of time.

While there have been shown and described illustrative embodiments that provide for auto-discovery of sequential, transactional milestones in application observability data, it is to be understood that various other adaptations and modifications may be made within the intent and scope of the embodiments herein. For example, while certain embodiments are described herein with respect to discovery of transactional milestone sequences, the techniques herein are not limited as such and may be used for other types of observability tasks, such as making inferences or predictions with respect to transactional milestone sequences, in other embodiments. In addition, while certain processes are shown, other suitable processes may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   determining, by a process, one or more key-value pairs associated with observability data for an online application comprising metrics, events, logs, or traces that are collected based on tests initiated by one or more agents that are part of an observability intelligence platform and are each installed on a network browser, computing device, or a server by:

identifying a start time and an end time within the observability data;

finding all key-value pairs within the start time and the end time within the observability data, selecting only key-value pairs based on a cardinality associated with the one or more key-value pairs;

searching, by the process, the observability data for events corresponding to the one or more key-value pairs;

building, by the process, a responsive event list with the events corresponding to the one or more key-value pairs within the observability data; and sorting, by the process, the responsive event list by associated timestamps to provide the responsive event list as a sequence of transactional milestones reached by one or more users of the online application.

2. The method of claim 1, wherein the observability data comprises metrics, events, logs, and traces.

3. The method of claim 1, further comprising:
generating a graphical visualization for a user interface to provide the responsive event list as the sequence of transactional milestones reached by one or more users of the online application.

4. The method of claim 3, wherein the graphical visualization portrays one or more customized milestones.

5. The method of claim 1, further comprising:
determining, by the process, the one or more key-value pairs by identifying specific key-value pairs.

6. The method of claim 5, further comprising:
listing the one or more key-value pairs based on a report corresponding to the observability data.

7. The method of claim 5, wherein the one or more key-value pairs are identified or selected, or both, by a user.

8. The method of claim 1, wherein the one or more key-value pairs comprises all the key-value pairs.

9. The method of claim 1, wherein the start time or the end time, or both, are selected by a user.

10. The method of claim 1, wherein determining the one or more key-value pairs further comprises:
identifying a length of time;
buffering streaming observability data for the length of time;
finding all key-value pairs within the streaming observability data during the length of time; and
selecting one or more of the key-value pairs to search.

11. The method of claim 10, wherein determining the one or more key-value pairs further comprises:
collecting all active key-value pairs; and
selecting distinct key-value pairs to search.

12. The method of claim 10, wherein collecting all active key-value pairs further comprises:
collecting all key-value pairs up to a threshold number of milestones and discarding key-value pairs past the threshold number of milestones.

13. The method of claim 10, further comprising:
maintaining a reverse index of all key-value pairs seen within the length of time in fields of different events.

14. A tangible, non-transitory, computer-readable medium storing program instructions that cause a device to execute a process comprising:
determining one or more key-value pairs associated with observability data for an online application comprising metrics, events, logs, or traces that are collected based on tests initiated by one or more agents that are part of an observability intelligence platform and are each installed on a network browser, computing device, or a server by:
identifying a start time and an end time within the observability data;
finding all key-value pairs within the start time and the end time within the observability data,
selecting only key-value pairs based on a cardinality associated with the one or more key-value pairs;
searching the observability data for events corresponding to the one or more key-value pairs;
building a responsive event list with the events corresponding to the one or more key-value pairs within the observability data; and
sorting the responsive event list by associated timestamps to provide the responsive event list as a sequence of transactional milestones reached by one or more users of the online application.

15. The tangible, non-transitory, computer-readable medium as in claim 14, wherein the process further comprises:
determining the one or more key-value pairs by identifying specific key-value pairs.

16. The tangible, non-transitory, computer-readable medium as in claim 14, wherein the process further comprises:
identifying a length of time;
buffering streaming observability data for the length of time;
finding all key-value pairs within the streaming observability data during the length of time; and
selecting one or more of the key-value pairs to search.

17. An apparatus, comprising:
one or more network interfaces to communicate with a network;
a processor coupled to the one or more network interfaces and configured to execute one or more processes; and
a memory configured to store a process that is executable by the processor, the process, when executed, configured to:
determine one or more key-value pairs associated with observability data for an online application comprising metrics, events, logs, or traces that are collected based on tests initiated by one or more agents that are part of an observability intelligence platform and are each installed on a network browser, computing device, or a server by:
identifying a start time and an end time within the observability data;
finding all key-value pairs within the start time and the end time within the observability data,
selecting only key-value pairs based on a cardinality associated with the one or more key-value pairs;
search the observability data for events corresponding to the one or more key-value pairs;
build a responsive event list with the events corresponding to the one or more key-value pairs within the observability data; and
sort the responsive event list by associated timestamps to provide the responsive event list as a sequence of transactional milestones reached by one or more users of the online application.

* * * * *